No. 714,156. Patented Nov. 25, 1902.
A. G. DAVIS.
PHASE MODIFIER AND SYSTEM OF ELECTRICAL DISTRIBUTION.
(Application filed Sept. 28, 1897.)
(No Model.) 2 Sheets—Sheet 1.

Witnesses: Inventor.

No. 714,156. Patented Nov. 25, 1902.
A. G. DAVIS.
PHASE MODIFIER AND SYSTEM OF ELECTRICAL DISTRIBUTION.
(Application filed Sept. 28, 1897.)
(No Model.) 2 Sheets—Sheet 2.

Witnesses
Inventor
Albert Gould Davis

UNITED STATES PATENT OFFICE.

ALBERT GOULD DAVIS, OF WASHINGTON, DISTRICT OF COLUMBIA, ASSIGNOR TO THE GENERAL ELECTRIC COMPANY, A CORPORATION OF NEW YORK.

PHASE-MODIFIER AND SYSTEM OF ELECTRICAL DISTRIBUTION.

SPECIFICATION forming part of Letters Patent No. 714,156, dated November 25, 1902.

Application filed September 28, 1897. Serial No. 653,373. (No model.)

*To all whom it may concern:*

Be it known that I, ALBERT GOULD DAVIS, a citizen of the United States, residing at Washington, in the District of Columbia, have invented certain new and useful Improvements in Phase-Modifiers and Systems of Electrical Distribution, (Case No. 11,) of which the following is a specification, taken in connection with the drawings hereto annexed.

A number of phase-modifying devices are known in the art as it exists to-day, in which multiphase current—as, for example, two-phase current—is produced from single-phase current by passing the single-phase current through one winding of a rotary transformer and generating in a second winding on said transformer a current dephased by the proper angle and carrying to translating devices current from the original source and also current from the second winding of the transformer. The objection to a device of this sort is that as the load varies the phase-angle of the current in the second circuit also varies, so that it is impossible to procure a fairly symmetrical system of multiphase currents at all loads. My invention is designed to obviate this objection, and I accomplish this result by generating from the original current a plurality of dephased currents and conducting the said dephased currents to translating devices. I do not conduct the original alternating current to translating devices, but use it simply, so far as the multiphase part of the system is concerned, for the generation of the multiphase currents. The result of this arrangement is that any change in the load of the secondary system will, at most, produce a corresponding change in each of the secondary circuits and will not affect their relative phase-angles. I also provide for an adjustment of the phase relation of the electromotive forces induced in the secondary system.

My invention also comprises various details of construction and arrangement to be hereinafter more particularly pointed out and claimed.

Figure 1:
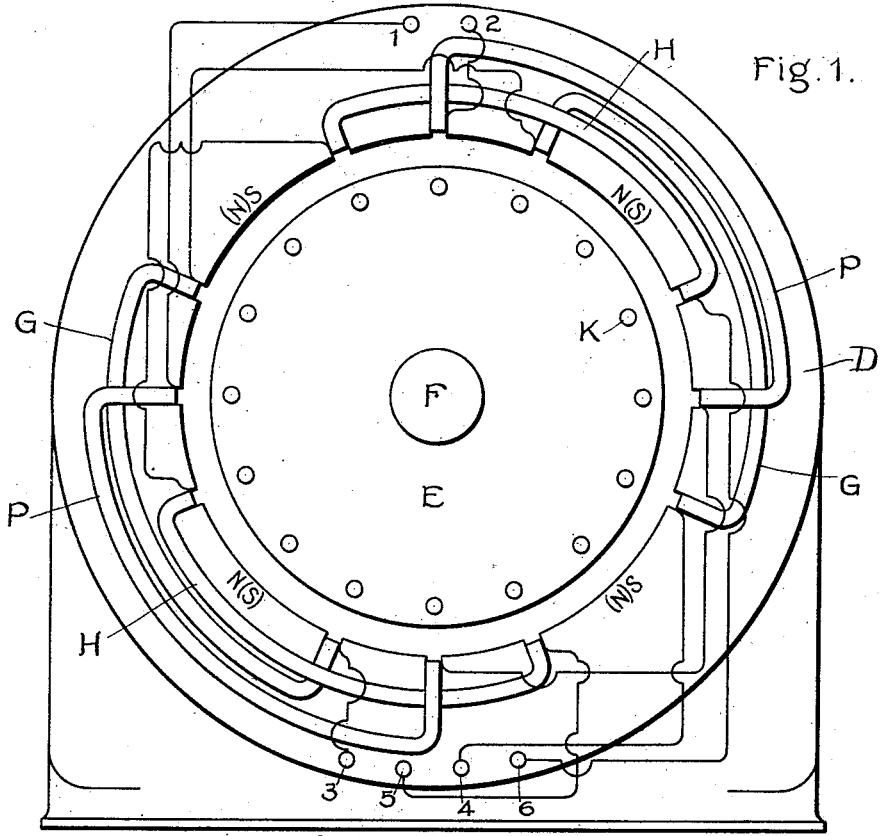
Figure 2:
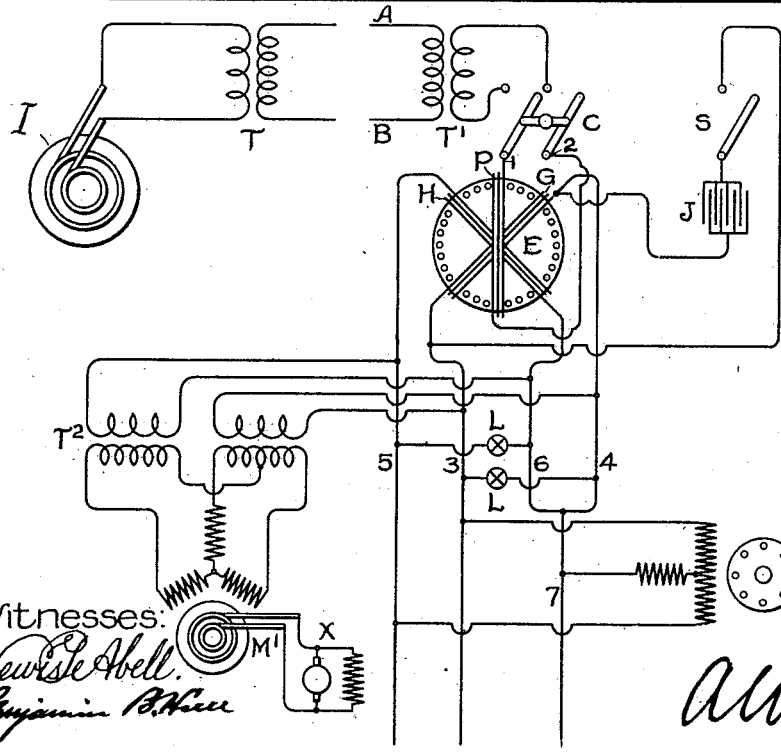
Figure 3:
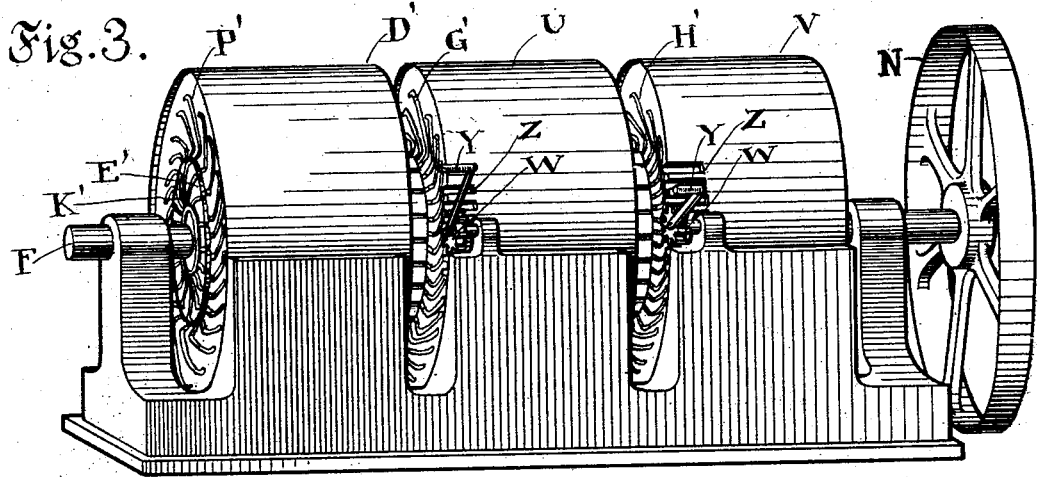
Figure 4:
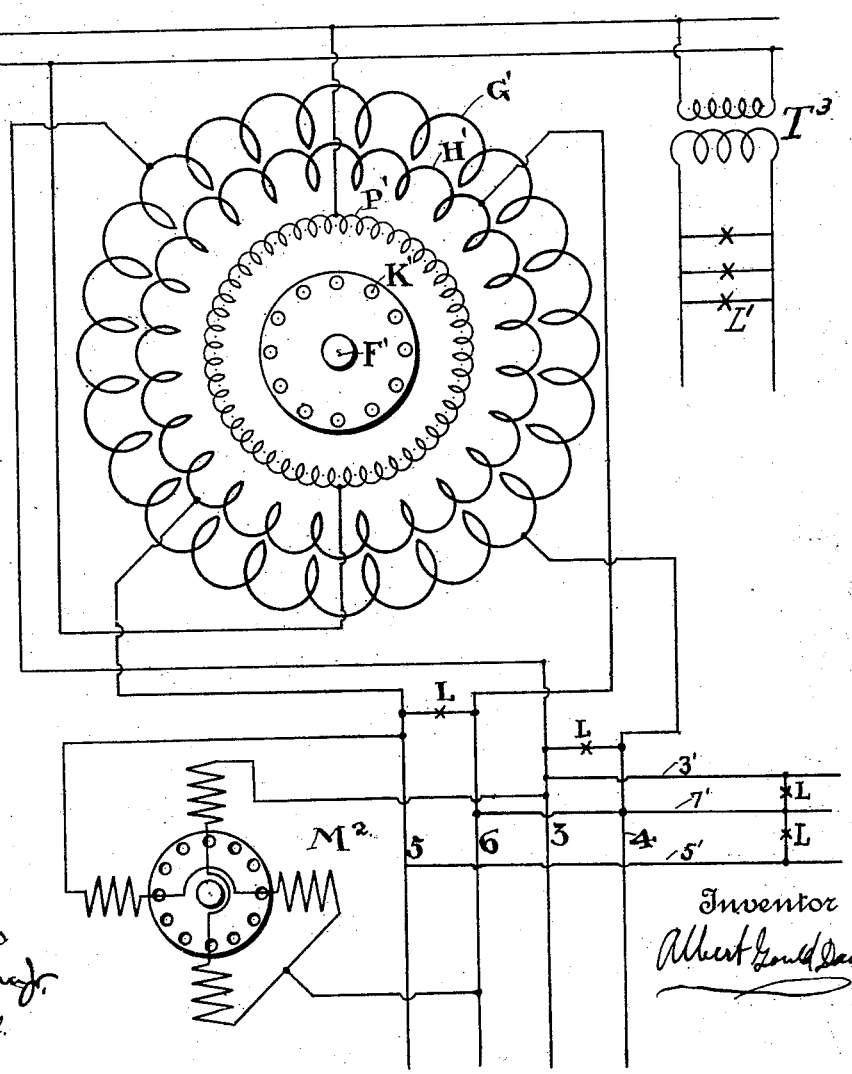

In the drawings attached to this specification, Figure 1 is an outline view of my improved phase-modifier. Fig. 2 is a diagrammatic view of a system of distribution embodying my invention. Fig. 3 is a perspective showing another form which my improved phase-modifier may take, and Fig. 4 is a diagram of the connections of the structure shown in Fig. 2.

Referring more particularly to Fig. 2, I is a single-phase alternating-current generator having, if desired, a tension-raising transformer T. From this transformer there extend the usual mains A B, which in turn feed the tension-reducing transformer T'. From this transformer T' wires 1 2 lead through the switch C to the phase-modifying device. This phase-modifying device, which is shown in outline in Fig. 1 and diagrammatically in Fig. 2, consists of an inducing member D and an induced member E. The induced member, shown in this case as the rotor, consists of a short-circuited winding K, of any ordinary type, revolving upon the shaft F. The inducing member is wound with a primary winding connected directly to the leads 1 2. I have illustrated my invention as embodied in a four-pole machine, or a machine with two rotating polar lines, and have shown two separate primary coils P P connected in series and so wound as to produce similar poles, as indicated by the letters N S (N) (S) in Fig. 1. There are also two sets of secondary windings, each set comprising two coils G G and H H, respectively, the coils of each set being preferably connected in series. In Fig. 1 I have shown the primary coils P P connected in series to the terminals 1 2. The secondary coils are also connected in series in two sets, the coils G G having their terminals at 3 4 and the coils H H at 5 6. The coils G G and H H are displaced from the coils P P in opposite directions and each by an amount equal to one-eighth of the polar pitch. The said coils are therefore displaced from each other by one-quarter of the polar pitch. Since the phase-modifier, as shown, is a four-pole machine, one-quarter of the polar pitch corresponds to one-eighth of the circumference of the core upon which the coils are wound. In order that the actual displacement of the coils may be rendered more apparent, I have in Fig. 2 diagrammatically illustrated the phase-modifier as a two-pole machine having its two secondary windings displaced by one-eighth of the polar pitch (in this case one-eighth of the circumference) from the primary winding. The free terminals of the winding G are connected to the secondary mains 3 4, while the free terminals of the winding H are connected to the secondary mains 5 6. To these secondary mains are connected various translating devices, as the lamps L L and the motors M M'. The motor M is a two-phase motor of the induction type, while the motor M' is a three-phase synchronous motor excited by the direct-current exciter X and fed through the phasing-transformer $T^2$. A condenser J in series with the switch S is shunted across one of the secondary windings, as G.

The action of a machine thus constructed is as follows: In starting, the switches S and C are closed and a current is admitted through the switch C and the leads 1 2 to the primary winding P. This current generates a field of force which induces current in the secondary windings G G H H, as well as in the winding K of the induced member E. The action of the condenser, which may obviously be replaced by any other phase-modifying device, is to dephase the currents flowing in the windings G and H sufficiently to produce a starting-torque. This constitutes a convenient means for starting my phase-modifier, but it forms no part of my invention and may be replaced by any suitable starting device, or the machine may be started by hand. When the induced member E, which should preferably supply no mechanical load, but which should have a considerable moment of inertia, has attained a sufficient speed, the switch S may be opened and the machine will run as a single-phase induction-motor. The windings P will then generate a stationary alternating four-pole field of force, but the reaction of the currents in the rotating induced member will transform this stationary field into a simple rotating four-pole field, and this rotating field cutting the windings G and H will induce currents therein differing in phase by an amount depending upon the relative positions of windings G, H, and P. In the form shown the windings G and H are displaced from the windings P in opposite directions and each by an amount equal to one-eighth of the polar pitch. It follows, therefore, that the currents in the windings G and H will be displaced from each other by ninety degrees and that this relative phase displacement will be independent of the transformer lag, and therefore of the amount of load on the secondary. Multiphase currents will flow in the circuits 3 4 5 6 and will be supplied to the translating devices L M M'.

Obviously two of the secondary mains may be joined in one, as shown at 7, when an interconnected two-phase system will result.

Referring more particularly to the modification shown in Figs. 3 and 4, A B are the single-phase mains, as before, connected to the inducing-winding P' upon the ring D'. Mounted upon the same bed-plate with the ring D' are two other rings U and V, while a single induced rotor E', wound with the short-circuited windings K', extends through the whole series of rings. The rings U and V are wound with the windings G' and H', which, as shown in Fig. 4, are connected through the secondary mains 3' 4' 5' 6' to translating devices, such as the lamps L L and the two-phase motor $M^2$. It will be seen that the action of this machine is related to that of the machine just described somewhat as the action of the Stanley two-phase motor described in United States Patent No. 524,534, dated August 14, 1894, is related to that of the ordinary rotary field two-phase motor. The primary winding P' induces currents in the induced windings K', which in turn induce currents in the secondary windings G' H'. Owing to the fact that the windings G' H' are angularly displaced from each other, they will have induced in them electromotive forces of different phases.

In any interconnected two-phase system—such, for example, as the system shown at 3' 7' 5', Fig. 4, and at 3 5 7, Fig. 2—the phases of the currents on the two sides tend to become displaced from their normal ninety-degree relation, owing to the interconnection. When such displacement occurs in any two-phase system whatever, I correct it by varying the relative phases of electromotive forces impressed upon the two sides of the system. Various other conditions may occur which render such correction necessary, and my present invention comprises an apparatus applicable to any two-phase system for accomplishing this correction.

Referring to Fig. 3, it will be seen that the members U V, carrying the windings G' H', are capable of rotating upon the bed-plate. Pinions W W, controlled by crank-handles Y Y or in any other suitable way, are shown as meshing with teeth Z Z in the peripheries of the members U V. A slight rotation of either of the members by means of the crank-handle or otherwise will cause a change in the phase of the electromotive forces impressed upon the corresponding windings. It is obvious that when such rotation is required it is preferable from a mechanical point of view to mount the windings G' and H' upon separate members, as shown in Fig. 3; but I do not restrict myself to this arrangement.

I prefer also in all of my rotary phase-modifying devices to place a fly-wheel N upon the shaft of the rotor. The reason for this is as follows: It is well known that the energy of a single-phase alternating current is not constant, but varies from instant to instant, while the energy of a symmetrical multiphase current is constant from instant to instant. It follows from this that the transformer must be able to store energy and to return it, and it is for this reason that all phase-shifting devices depending merely on condensers and self-induction coils have been highly inefficient. In a phase-modifier of the rotating type this energy is stored mechanically in the rotating member and the presence of a fly-wheel greatly assists the action. Power may be taken off at N, if desired, when the machine becomes a combined motor and phase-changer.

It is obvious that my method of regulating the phase displacement, which consists in shifting the angular position of one or more of the secondary windings, is applicable to various forms of phase-modifying devices different from those here shown.

I have shown in Fig. 2 a tension-raising transformer interposed between the primary mains and the phase-modifier. It is obvious that this transformer may be dispensed with where the tension of the current on the mains is already such as to give a suitable tension on the secondary system. Where this is not the case, I may cause the machine to act as a transformer, both of phase and tension, and produce any desired voltage on the secondary system by suitably proportioning the primary and secondary windings. For example, I have shown in Fig. 4 a primary winding P' of a large number of turns and secondary windings G' H' of a smaller number of turns, so that the voltage of the current on the secondary system will be lower than that on the primary system.

I have for the sake of simplicity illustrated my improved phase-modifying devices as generating two-phase current from single-phase current. It will, however, be evident that they are not restricted to that use, but that they may be designed to effect any desired increase in the number of phases of an alternating current.

I have shown the induced member as composed of an ordinary short-circuited armature; but it will be obvious that any form of armature suitable for use with an alternating-current field-magnet may be used; nor am I restricted to the use of a rotating induced member, as it is obvious that a mere reversal would be within the scope of my invention.

My improved phase-modifying devices may be applied to any ordinary distribution system in connection with the usual single-phase translating devices, and I have shown in Fig. 4 a single-phase transformer $T^3$ in shunt to the mains A B and feeding-lamps L'.

I do not restrict myself to the specific forms herein shown and described, as it is evident that they may be greatly varied without departing from the spirit and scope of my invention.

I do not claim in this application the novel method herein disclosed, as this method constitutes the subject-matter of a divisional application, Serial No. 104,627, filed April 25, 1902.

What I claim as my invention, and desire to secure by Letters Patent of the United States, is—

1. A phase-modifying device comprising a plurality of magnetic structures, one or more of said structures carrying primary windings and constituting an inducing member, and other of said structures carrying secondary windings, and an induced member in inductive relation to all of said magnetic structures and capable of rotation with respect to the same.

2. The combination in a phase-modifying device of a primary winding, an induced winding or armature capable of relative rotation, a secondary winding fixed with relation to the primary winding, and means for adjusting the angular relation of the secondary winding.

3. A system of electrical distribution comprising a source of single-phase electromotive force, lines extending therefrom, and a phase-modifying device containing a primary winding, a relatively rotatable induced member, and a plurality of secondary windings, the primary winding being so connected as to be fed from the mains, in combination with translating devices so connected as to be fed from the said secondary windings only.

4. A phase-modifying device comprising in combination, a primary winding, a plurality of secondary windings angularly displaced from each other and from the primary winding, an induced member capable of rotation relatively to said primary and secondary windings, and connections from the secondary windings to a multiphase translating device.

5. A phase-modifying device comprising a single-phase primary winding, secondary windings upon separate cores, and an induced member capable of rotation relative to said windings, substantially as described.

6. A phase-modifying device comprising a single-phase primary winding, secondary windings upon separate cores, means for adjusting the relative angular displacement of the secondary windings, and an induced member capable of rotation relative to said windings, substantially as described.

7. The combination with a distribution system, of a plurality of generating-coils constituting sources of dephased currents connected thereto, and means for varying the angular position of one or more of said coils with relation to the other coil or coils, and thereby correcting or varying the phase displacement of the currents in the system, without interfering with the operation of the system.

8. The combination with an interconnected two-phase system, of means for adjusting the phase relation of the impressed electromotive forces of the system to correct the phase displacement due to the interconnection without interfering with the operation of the system.

Signed at Washington, District of Columbia, this 28th day of September, A. D. 1897.

ALBERT GOULD DAVIS.

Witnesses:
  W. H. DAVIS,
  S. G. HOPKINS.